Patented Apr. 25, 1933

1,905,516

UNITED STATES PATENT OFFICE

HENRY B. SMITH, OF ROCHESTER, NEW YORK, ASSIGNOR TO EASTMAN KODAK COMPANY, OF ROCHESTER, NEW YORK, A CORPORATION OF NEW YORK

CELLULOSIC COMPOSITION OF MATTER CONTAINING A DIALKYL HYDROPHTHALATE

No Drawing.     Application filed June 17, 1931. Serial No. 545,083.

This invention relates to compositions of matter in which an organic derivative of cellulose, such, for instance as cellulose acetate, is combined or mixed with other substances, such as a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and products, artificial silk, varnishes or lacquers, and the like.

One object of this invention is to produce a composition of matter which may be made into permanently transparent, strong and flexible sheets or films of desired thinness which are substantially waterproof, are unaffected by ordinary photographic fluids and possess the desired properties of a support for sensitive photographic coatings. Another object of my invention is to produce a composition which is capable of easy and convenient manipulation in the plastic and analogous arts, such as in the manufacture of sheets, films, artificial silk filaments, varnishes, lacquers and the like, and to produce a composition which will not injure, or be injured by, the substances or surfaces with which it is associated during manufacture. Another object of my invention is to produce a composition of matter containing cellulose acetate which has a high degree of flexibility, softness, pliability and clarity. Other objects will become apparent to those skilled in the art to which this invention pertains.

While cellulose acetate has been known for decades, it has also been known that to utilize it in the various plastic arts it is necessary to mix therewith such plasticizing or conditioning agents as triphenylphosphate, monochlornaphthalene or the like. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition products for the same or similar purposes are also added to cellulose acetate to prepare it for use in the other plastic arts, such as in the manufacture of lacquers, varnishes, artificial silk filaments, molded compounds and the like. While the plasticizers or other addition agents heretofore discovered have had their utility in the art, the increasing use to which cellulose acetate has been put and the increasing number of desirable properties required of cellulose acetate for most purposes have made the discovery of new and economical plasticizers or other addition agents a matter of considerable importance to the art. This has been a problem of some difficulty, since many of the nitro-cellulose solvents are not solvents for cellulose acetate, and many substances which act as plasticizers for nitro-cellulose are not sufficiently compatible with cellulose acetate to be used as plasticizers in cellulose acetate compositions.

I have discovered that valuable properties may be induced in and/or contributed to compositions containing cellulose organic derivatives, such as cellulose acetate, by adding thereto as a plasticizing compound, a dialkyl hexahydrophthalate together with a solvent, such as acetone, which will dissolve both the cellulose derivative and plasticizer. These plasticizers have the general formula $C_6H_{10}(COOR)_2$, in which R is an alkyl group. Examples of this class of plasticizers are diethyl cis-hexahydrophthalate and dibutyl cis-hexahydrophthalate. They are compatible with organic derivatives of cellulose and particularly compatible with cellulose acetate in the percentages hereinafter given. They are obtainable upon the open market, and may be produced by esterifying cis-hexahydrophthalic acid in the same manner in which phthalic acid is esterified. The cis- and trans-hexahydrophthalic acids are easily transformed one into the other. The particularly useful properties which the alkyl hexahydrophthalates induce in or contribute to cellulosic compositions containing them are hereinafter enumerated.

In order that those skilled in this art may better understand my invention I would state, by way of illustration, that for the manufacture of photographic film or other sheets my new compositions of matter may be compounded as follows: 100 parts of acetone soluble cellulose acetate i. e. cellulose acetate containing from 38% to 42% acetyl radical, approximately, is dissolved with stirring at atmospheric temperature in 300 to 500 parts, preferably 400 parts, by weight, of acetone. To this solution may be added from 10 to 50 parts by weight of diethyl cis-hexahydrophthalate, it being found preferable to employ approximately 30 to 50 parts thereof. Within the limits stated, the amount of plasticizer may be decreased or increased, depending upon whether it is desired to decrease or increase, respectively the properties which this plasticizer contributes to the finished product. The amount of solvent employed may also be increased or decreased, depending upon whether it is desired to have a more or less freely flowing composition, respectively. While I have described the cis-compounds, it will be obvious that the similar employment of trans-hexahydrophthalates is within the scope of my invention and is included (together with the use of the cis-compounds) in the claims specifying the hexahydrophthalates broadly.

A composition of matter prepared as above described may be deposited upon any suitable film-forming surface to form a film or sheet, in a manner well known to those skilled in the art. A film so produced has permanently brilliant transparency and low inflammability, burning no more readily than ordinary newsprint. Films or sheets produced in accordance with my invention have good flexibility. For instance, films of cellulose acetate plasticized with 30% to 50% (parts by weight based on the acetate) of diethyl hexahydrophthalate had an initial flexibility of 65% to 235% higher than film containing no plasticizer. Furthermore, film so plasticized maintains flexibility in a superior fashion. For instance, film containing 30% to 50% of diethyl hexahydrophthalate maintained flexibility at 65° C. for over 177 days, and film containing 20% of dibutyl hexahydrophthalate maintained flexibility at 65° C. for 72 days, whereas an unplasticized film became brittle in 58 days, all of which demonstrates that a film so plasticized will withstand ordinary usage satisfactorily for many years.

Other similar solvents (instead of acetone) which are compatible with the cellulose acetate and my new plasticizers may also occur to those skilled in this art. In like manner these plasticizers may be compounded with other single esters of cellulose, such as cellulose propionate, butyrate and the like, or with mixed organic and/or inorganic esters, such as cellulose aceto-stearate, cellulose aceto-propionate, cellulose aceto-malate, or cellulose nitro-acetate, a suitable solvent which will dissolve both the cellulose derivative and the plasticizer being employed.

Inasmuch as my above described compositions of matter are quite useful in the preparation of films and sheets, it will be apparent that my new plasticizers may also be employed with advantage in the other branches of the plastic art. For instance, my above described compositions of matter may be employed in the manufacture of artificial silk by the dry spinning method. With the proper coagulating bath they may also be employed for wet spinning. It may be desired to employ compositions of different viscosity or evaporation characteristics, but this is a mere matter of changing the solvent proportion or adding evaporation retardents or other high or intermediate boiling constituents, as has been well known in the art for more than a decade. My novel plasticizers may also be employed with advantage in connection with a number of the known lacquer and varnish formulæ with which they may be found to be compatible. In such cases the plasticizer is usually first put into solution with the cellulose derivative solution and if non-solvents are added for the purpose of cheapening the composition they are added only to such an extent as will not precipitate the derivative from solution. Also the plasticizer is usually employed in larger amounts, such as from 50 to 60 parts, in compounding lacquers. Other uses within the scope of my invention will also suggest themselves to those skilled in the art and are to be included within the scope of the claims appended hereto.

Moreover, I have found that, upon the addition to cellulose acetate of approximately 100% of diethyl cis-hexahydrophthalate, quite unexpected compatibility of the plasticizer with the cellulose acetate exists and also that quite unexpected flexibility, plasticity and clarity of the final product results. Such compositions have great utility where a highly flexible compound is desired, such as the coating of a base (for instance, cloth or other fabric) in the production of artificial leather or the production of relatively thin sheets wherein more than the usual flexibility is important. Such a composition, if converted, for instance, into sheet form will be found to be supple and non-rigid, and to have the ability to conform readily to a surface upon which it may be placed, and this even at atmospheric temperatures.

This novel composition of matter is produced by merely mixing the plasticizer with cellulose acetate and then adding sufficient of a common solvent, such as acetone, whereupon an intimate mixture of the plasticizer with the cellulose acetate results. The amount of acetone or other common solvent to be employed varies, of course, within rather wide limits depending upon the fluidity of the composition desired. 100 parts of acetone will suffice for many purposes, although we prefer to use 400 parts. Various high boilers or evaporation retardents, such as ethyl lactate, amyl acetate or the like may also be added if desired, as is well known in this art.

The composition of matter so produced may then be coated into sheets in the usual way by depositing it upon plates or rolls and permitting the solvent to evaporate. If my novel composition is to be employed in the manufacture of artificial leather, it may be coated upon, for instance, a cloth support and the solvent permitted to evaporate, or the cloth support may be caused to pass through the cellulose acetate-plasticizer composition and permitted to absorb the solution, the solvent in the coating being then permitted to evaporate. In either case, the solvent may, of course, be recovered if desired by condensing the vapors, etc.

While above and in certain of the claims appended hereto, I have referred to the use of a plasticizer in approximately equal proportions, namely in a ratio of approximately 100%, it will be understood that within this terminology variations of from 10 to 15% less than 100% of plasticizer and as much as 25 to 50% more than 100% of the plasticizer may in some instances be desirable.

What I claim as my invention and desire to be secured by Letters Patent of the United States is:

1. A composition of matter comprising an organic ester of cellulose and a lower dialkyl hexahydrophthalate.

2. A composition of matter comprising an organic ester of cellulose and a lower dialkyl cis-hexahydrophthalate.

3. A composition of matter comprising cellulose acetate and a lower dialkyl hexahydrophthalate.

4. A composition of matter comprising cellulose acetate and a lower dialkyl cis-hexahydrophthalate.

5. A composition of matter comprising cellulose acetate and diethyl cis-hexahydrophthalate.

6. A composition of matter comprising cellulose acetate and dibutyl cis-hexahydrophthalate.

7. A composition of matter comprising 100 parts of cellulose acetate and about 10 to 100 parts, by weight, of diethyl cis-hexahydrophthalate.

8. A composition of matter comprising 100 parts of cellulose acetate and about 10 to 20 parts, by weight, of dibutyl cis-heahydrophthalate.

9. A relatively thin sheet comprising 100 parts of cellulose acetate and approximately 10 to 100 parts, by weight, of diethyl cis-hexahydrophthalate.

10. A relatively thin sheet comprising 100 parts of cellulose acetate and approximately 10 to 20 parts, by weight, of dibutyl cis-hexahydrophthalate.

Signed at Rochester, New York, this 5th day of June, 1931.

HENRY B. SMITH.